United States Patent [19]
Egbert et al.

[11] Patent Number: 6,091,707
[45] Date of Patent: Jul. 18, 2000

[54] METHODS AND APPARATUS FOR PREVENTING UNDER-FLOW CONDITIONS IN A MULTIPLE-PORT SWITCHING DEVICE

[75] Inventors: Chandan Egbert, San Jose; Bahadir Erimli, Mountain View; Eric Tsin-Ho Leung, Sunnyvale; Thomas J. Runaldue, San Jose, all of Calif.

[73] Assignee: Advanced Micro Devices, Inc., Sunnyvale, Calif.

[21] Appl. No.: 08/993,886

[22] Filed: Dec. 18, 1997

Related U.S. Application Data

[60] Provisional application No. 60/038,025, Feb. 14, 1997.

[51] Int. Cl.$^7$ .................................................. H04L 12/54
[52] U.S. Cl. ......................... 370/229; 370/412; 370/428; 395/872
[58] Field of Search .................................... 370/229, 230, 370/401, 402, 412, 428, 429, 415, 235, 465, 468, 463, 253; 395/872, 200; 709/232, 231; 710/52

[56] References Cited

U.S. PATENT DOCUMENTS

| | | | |
|---|---|---|---|
| 4,648,036 | 3/1987 | Gallant | 707/203 |
| 5,210,773 | 5/1993 | Schmid et al. | 375/215 |
| 5,307,345 | 4/1994 | Lozowick et al. | 370/428 |
| 5,515,376 | 5/1996 | Murthy et al. | 370/402 |
| 5,521,913 | 5/1996 | Gridley | 370/389 |
| 5,560,038 | 9/1996 | Haddock | 709/236 |
| 5,598,581 | 1/1997 | Daines et al. | 370/401 |
| 5,629,928 | 5/1997 | Calvignac et al. | 370/237 |
| 5,737,635 | 4/1998 | Daines et al. | 395/872 |
| 5,815,673 | 9/1998 | Mote, Jr. | 395/287 |
| 5,859,980 | 1/1999 | Kalkunte | 395/200.61 |

FOREIGN PATENT DOCUMENTS 0 426 911 A1  5/1991  European Pat. Off. .

OTHER PUBLICATIONS

"100Base–T/IEEE 802.12/Packet Switching", M. Molle et al., IEEE Communications Magazine, vol. 34, No. 8, Aug. 1996, pp. 64–73.

"Cut–Through Switch Cuts Flawed Frames", Stephen Saunders, Data Communications, vol. 25, No. 1, Jan. 1996, pp. 74 and 76.

"Hub Pulls the Cork on Server Bottlenecks", Stepehn Saunders, Data Communications, vol. 22, No. 12, Sep. 1993, pp. 41–42.

"Token Ring Switches Make It to Market", Stepehn Saunders, Data Communications, vol. 24, No. 4, Mar. 21, 1995, pp. 49–51.

*Primary Examiner*—Chau Nguyen
*Assistant Examiner*—Ken Vanderpuye

[57] ABSTRACT

An interface for use in a data forwarding device is connected between the receive ports and transmit ports of a device. The interface ensures that data being forwarded from a receive port to a transmit port has actually been received. The interface includes a queuing circuit and a de-queuing circuit. The queuing circuit receives data from the receive port, identifies the receive port, counts the data received, and buffers the data. The de-queuing circuit retrieves the buffered data at a scheduled time based on the receive port's mode, and forwards the data to a transmit port provided that the amount of data received by the queuing circuit is at least as great as the amount of data already forwarded by the de-queuing circuit plus a threshold safe level amount of data.

16 Claims, 6 Drawing Sheets

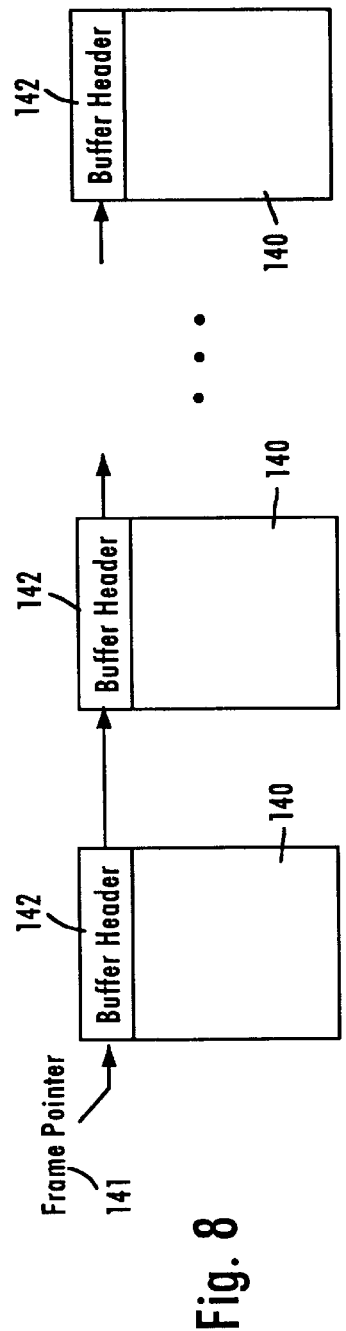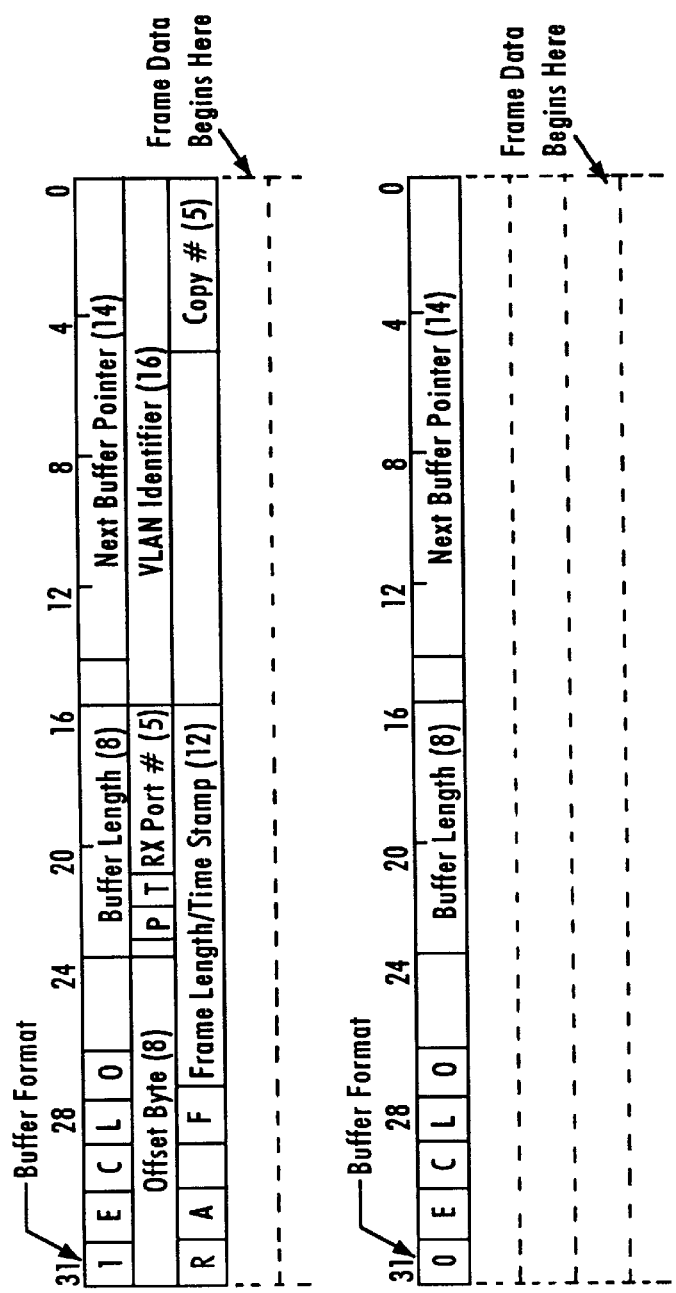
Fig. 8
Fig. 9a
Fig. 9b

METHODS AND APPARATUS FOR PREVENTING UNDER-FLOW CONDITIONS IN A MULTIPLE-PORT SWITCHING DEVICE

RELATED APPLICATIONS

This application claims priority from Provisional patent application Ser. No. 60/038,025, filed Feb. 14, 1997, entitled "INTEGRATED MULTI PORT SWITCH", which is incorporated herein by reference.

1. Field of the Invention

The present invention relates to the field of data reception and transmission, and more particularly, to methods and apparatus for preventing an under-flow condition during the forwarding (i.e., transmission) of data received at a multiple-port device.

2. Background Art

In devices which receive and forward data, such as network packet switches for packet switched networks, the device can be configured to forward data with different latencies. For example, one device may be configured to forward data, such as a frame of data, with very low latency, such that forwarding of the data is initiated even while the frame is still being received.

Even though a low latency forwarding scheme provides extremely fast forwarding of data through a device, e.g., at line-rate speed, it has the drawback of not providing any error protection because the data begins to be transmitted before it is determined whether the frame contains a CRC (cyclic redundancy check) error, or is of legal length (e.g., at least 64 bytes).

To provide a much higher level of network error protection, a device may be configured to receive a complete frame of data before beginning the forwarding of the frame. This allows the device to perform CRC error checking and screen out frame fragments before forwarding. However, this increased network protection is achieved at the cost of higher latency.

Certain systems achieve an intermediate latency and limited network error protection by configuring the device to receive a threshold amount of data, but not necessarily a complete frame, before initiating a forwarding of the frame being received. This prevents fragments below a certain size from being forwarded, but may not provide CRC error checking.

Unfortunately, in the low latency forwarding schemes and intermediate latency schemes discussed above, an "under-flow" condition can exist within the device when the received data arrives slower than the transmitted data. This is especially true, for example, in discretely timed systems wherein the source and destination devices have different timing schemes, or in systems that include time-shared resources, or further, in systems that have error-correction and/or re-transmission protocols/standards., There is an increasing need in current packet switched networks for network switches having multiple ports. These ports may have a variety of different end stations connected to the various ports. For example, one of the various ports may be sending data (such as video in the form of a stream of data) which should be forwarded with a lower latency, and can tolerate less network error protection. Other ports may be sending data, for example text, which should be forwarded with more network error protection, and therefore with a higher latency. However, the earlier described modes do not always accommodate the different types of traffic that the multiple ports of the device may be required to carry, for example to provide the proper network error protection and latency that is appropriate for the particular type of traffic. Moreover, the different types of traffic and different latency and timing schemes may introduce an under-flow condition into the stream of data traffic.

SUMMARY OF THE INVENTION

There is a need for methods and apparatus for initiating the forwarding of data received at a device having multiple ports to provide flexibility at the individual ports to accommodate the different types of traffic carried by the individual ports while also preventing under-flow conditions.

This and other needs are met by an embodiment of the present invention that provides for preventing under-flow of data forwarded in a device having multiple receive and transmit ports. The method includes independently designating each of the receive ports with a mode. The mode indicates the data that must be received by that receive port prior to initiation of the forwarding of the data from the device. The method includes determining which of the receive ports is receiving a set of data, as the set of data is being received at the receive port, and determining the designated mode of the receive port that is receiving the set of data. The set of data is forwarded to one or more of the transmit ports in accordance with the designated mode of the receive port provided that the difference between an amount of the set of data that has been received at that receive port and an amount of the set of data that has been forwarded to a transmit port is at least as great as a specified threshold amount for the designated mode. The specified threshold amount is sized so as to prevent an under-flow condition in which the device attempts to forward more of the set of data than has been received by the device.

The earlier stated needs are also satisfied by another embodiment of the present invention, that provides an interface for use in a data forwarding device that has a plurality of receive ports and a plurality of transmit ports. The interface is coupled between the plurality of receive ports and the plurality of transmit ports. The interface ensures, for each of the plurality of receive ports, that data being forwarded from the receive port to at least one of the transmit ports has actually been received. The interface includes a queuing circuit and a de-queuing circuit. The queuing circuit is coupled to at least one of the plurality of receive ports, and is configured to receive data from the receive port. The queuing circuit is also configured to identify the receive port from which the data is being received, and count an amount of data received. The queuing circuit is also configured to buffer the data received. The de-queuing circuit is coupled to the queuing circuit and configured to retrieve the buffered data from the queuing circuit at a specific time. The de-queuing circuit is further configured to forward the retrieved data to at least one of the plurality of transmit ports provided that the amount of data received by the queuing circuit, for an identified receive port, is at least as great as the sum of an amount of data forwarded by the de-queuing circuit and a threshold safe level amount of data.

In accordance with certain embodiments of the present invention, the queuing circuit includes a memory and a controller. The memory is arranged to buffer at least a portion of the data received by the queuing circuit and the controller is coupled to the memory and at least one of the plurality of receive ports and configured to receive data from the receive ports. The controller is configured to access the memory and store the data in the memory.

In accordance with another embodiment of the present invention a control circuit is provided for preventing underflow conditions in a data forwarding device. The control circuit includes a supply circuit and an interface circuit. The supply circuit provides an incoming stream of data to the interface circuit. The interface circuit monitors the incoming stream of data. The interface circuit produces a corresponding outgoing stream of data that lags behind the incoming stream of data by a first latency. The interface circuit is further arranged to temporarily delay the outgoing stream of data by an additional latency if the incoming stream of data is provided, by the supply circuit, at a receive rate that is slower than the transmit rate for the outgoing stream of data.

In accordance with still other embodiments of the present invention, methods and apparatus are adaptable for supporting forwarding modes such as a cut-through mode, a fragment-free mode, and a store-and-forward mode, while ensuring against under-flow conditions.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 8 is a block diagram of a linked list data structure, in accordance with an embodiment of the present invention.

FIGS. 9a and 9b illustrate the format of a frame buffer header format, in accordance with an embodiment of the present invention.

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Figure 1:
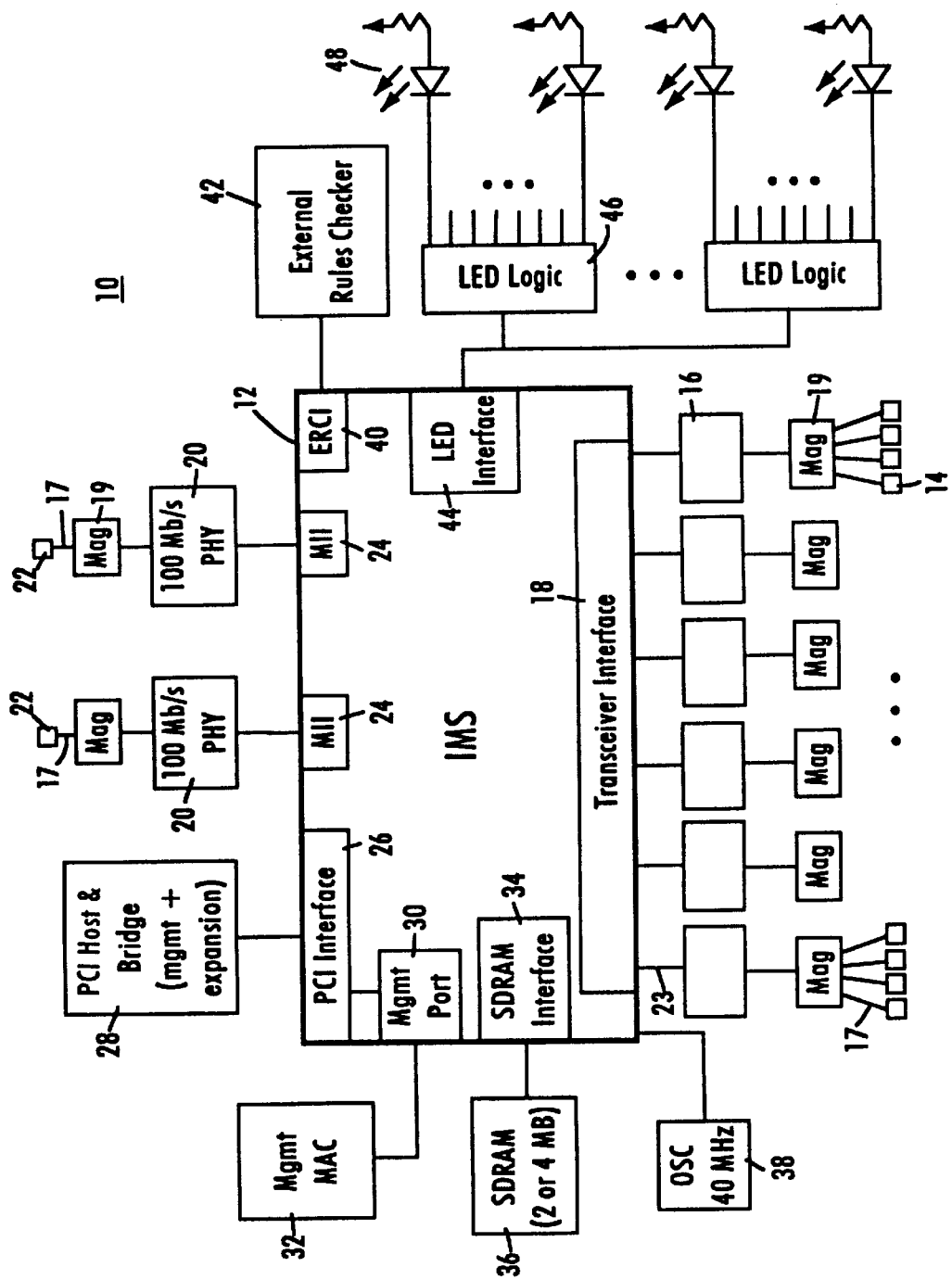
FIG. 1 is a block diagram of a packet switched system constructed in accordance with an embodiment of the present invention.

FIG. 1 is a block diagram of an exemplary system in which the present invention may be advantageously employed. The exemplary system 10 is a packet switched network, such as an Ethernet network. The packet switched network includes an integrated multi port switch (IMS) 12 that enables communication of data packets between network stations. The network may include network stations having different configurations, for example twenty-four (24) 10 megabit per second (M\bps) network stations 14 that send and receive data at a network data rate of 10 M\bps, and two 100 M\bps network stations 22 that send and receive data packets at a network speed of 100 M\bps. Hence, the switch 12 selectively forwards data packets received from the network stations 14 or 22 to the appropriate destination based upon Ethernet protocol.

According to the disclosed embodiment, the 10 M\bps network stations 14 send and receive data packets to and from the switch 12 via a media 17 and according to half-duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time after the deassertion of a receive carrier on the media, known as the interpacket gap interval (IPG). If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 100 M\bps network stations 22 preferably operate in full-duplex mode according to the proposed Ethernet standard IEEE 802.3x Full-Duplex with Flow Control—Working Draft (0.3). The full-duplex environment provides a two-way, point-to-point communication link between each 100 M\bps network station 22 and the switch 12, where the switch 12 and the respective stations 22 can simultaneously transmit and receive data packets without collisions. The 100 M\bps network stations 22 each are coupled to network media 17 via 100 M\bps physical (PHY) devices 20 of type 100 Base-TX, 100 Base-T4, or 100 Base-FX. The switch 12 includes a media independent interface (Mi\H) 24 that provides a connection to the physical devices 20. The 100 M\bps network stations 22 may be implemented as servers or routers for connection to other networks.

As shown in FIG. 1, the network 10 includes a series of switch transceivers 16 that perform time division multiplexing and time division demultiplexing for data packets transmitted between the switch 12 and the 10 M\bps stations 14. A magnetic transformer module 19 maintains the signal waveform shapes on the media 17. The switch 12 includes a transceiver interface 18 that transmits and receives data packets to and from each switch transceiver 16 using a time-division multiplexed protocol across a single serial non-return to zero (NRZ) interface 23. The switch transceiver 16 receives packets from the serial NRZ interface 23, demultiplexes the received packets, and outputs the packets to the appropriate end station 14 via the network media 17. According to the disclosed embodiment, each switch transceiver 16 has four independent 10 M\bps twisted-pair ports and uses 4:1 multiplexing across the serial NRZ interface enabling a four-fold reduction in the number of PINs required by the switch 12.

The switch 12 contains a decision making engine, switching engine, buffer memory interface, configuration/control/ status registers, management counters, and MAC (media access control) protocol interface to support the routing of data packets between the Ethernet ports serving the network stations 14 and 22. The switch 12 also includes enhanced functionality to make intelligent switching decisions, and to provide statistical network information in the form of management information base (MIB) objects to an external management entity, described below. The switch 12 also includes interfaces to enable external storage of packet data and switching logic in order to minimize the chip size of the switch 12. For example, the switch 12 includes a synchronous dynamic RAM (SDRAM) interface 34 that provides access to an external memory 36 for storage of received frame data, memory structures, and MIB counter information. The memory 36 may be an 80, 100 or 120 MHz synchronous DRAM having a memory size of 2 or 4 Mb.

The switch 12 also includes a management port 30 that enables an external management entity to control overall operations of the switch 12 by a management MAC interface 32. The switch 12 also includes a PCI interface 26 enabling access by the management entity via a PCI host and bridge 28. Alternatively, the PCI host and bridge 28 may serve as an expansion bus for a plurality of switch devices 12.

The switch 12 includes an internal decision making engine (FIG. 2) that selectively transmits data packets received from one source to at least one destination station. The internal decision making engine may be substituted with an external rules checker. The switch 12 includes an external rules checker interface (ERCI) 40 that allows use of an external rules checker 42 to make frame forwarding decisions in place of the internal decision making engine. Hence, frame forwarding decisions can be made either by the internal switching engine or the external rules checker 42.

The switch 12 also includes an LED interface 44 that clocks out the status of conditions per port and drives LED external logic 46. The LED external logic 46, in turn, drives LED display elements 48 that are human readable. An oscillator 38 provides a 40 MHz clock input for the system functions of the switch 12.

Figure 2:
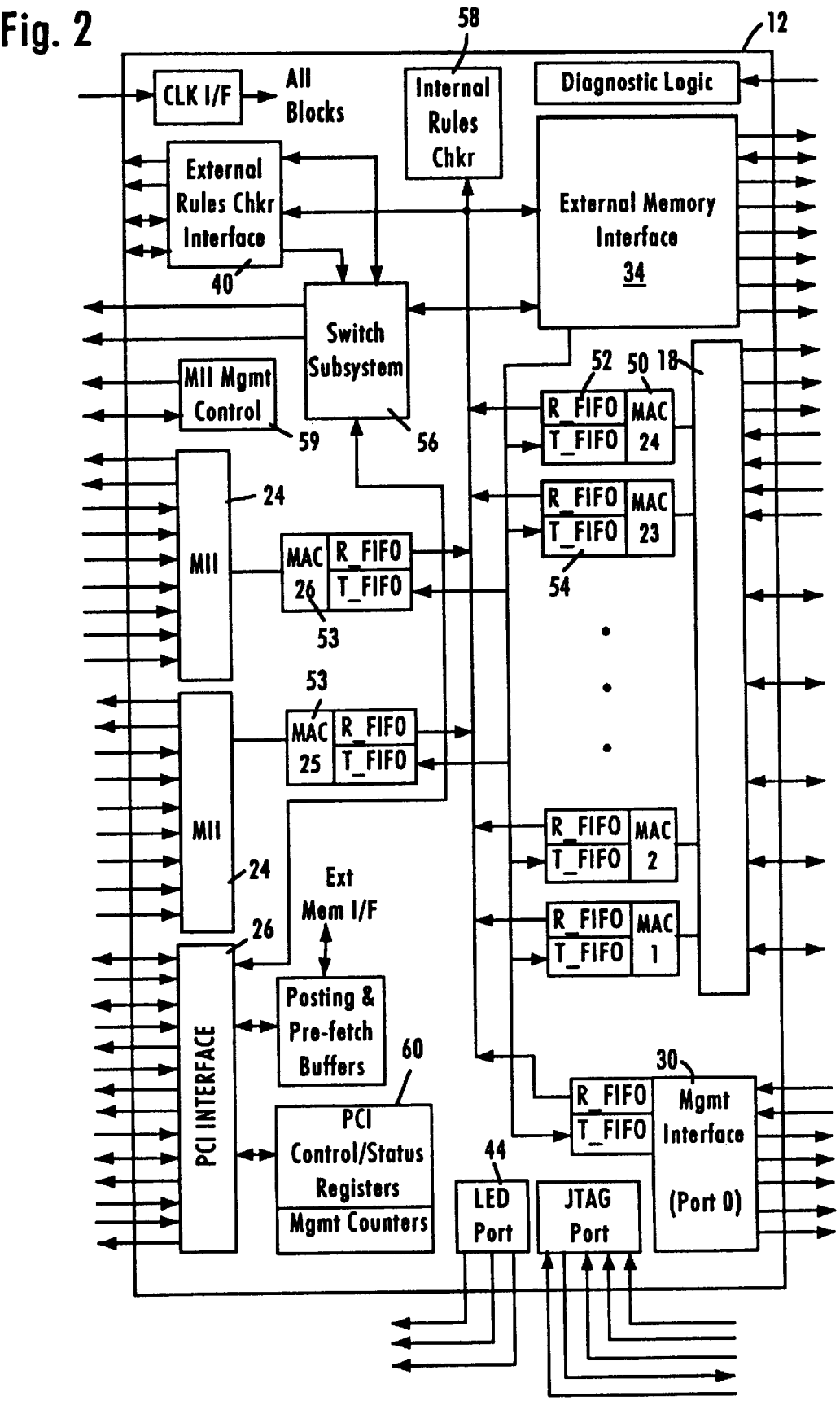
FIG. 2 is a block diagram of a multi port switch constructed in accordance with an embodiment of the present invention and used in the packet switched system of FIG. 1.

FIG. 2 is a block diagram of the integrated multi port switch (IMS) 12 of FIG. 1. The switch 12 includes twenty-four (24) 10 M\bps media access control (MAC) ports 50 for sending and receiving data packets in half-duplex between the respective 10 M\bps network stations 14 (ports 1–24), and two 100 M\bps MAC ports 53 for sending and receiving data packets in full-duplex between the respective 100 M\bps network stations (ports 25, 26). As described above, the management interface 30 also operates according to MAC layer protocol (port 0). Each of the MAC ports 50, 53 and 30 has a receive first in-first out (FIFO) buffer 52 and transmit FIFO 54. Data packets from a network station are received by the corresponding MAC port and stored in the corresponding receive FIFO 52. The received data packet is output from the corresponding receive FIFO 52 to the external memory interface 34 for storage in the external memory 36.

The header of the received packet is also forwarded to a decision making engine, either internal rules checker 58 or the external rules checker interface 40, to determine which MAC ports will output the data packet. Specifically, the packet header is forwarded to the internal rules checker 58 or the external rules checker interface 40, depending on whether the switch 12 is configured to operate using the internal rules checker 58 or the external rules checker 42. The internal rules checker 58 and external rules checker 42 provide the decision making logic for determining the destination MAC port for a given data packet. The decision making engine may thus output a given data packet to either a single port, multiple ports, or all ports (i.e., broadcast). For example, each data packet includes a header having source and destination address, where the decision making engine may identify the appropriate output MAC port based upon the destination address. Alternatively, the destination address may correspond to a virtual address that the appropriate decision making engine identifies as corresponding to a plurality of network stations. Alternatively, the received data packet may include a VLAN (virtual LAN) tagged frame according to IEEE 802.1d protocol that specifies another network (via a router at one of the 100 M\bps stations 22) or a prescribed group of stations. Hence, either the internal rules checker 58 or the external rules checker 42 via the interface 40 will decide whether a frame temporarily stored in the external memory 36 should be output to a single MAC port or multiple MAC ports.

Use of the external rules checker 42 provides advantages such as increased capacity, a random-based ordering in the decision queue that enables frame forwarding decisions to be made before the frame is completely buffered to external memory, and enables decisions to be made in an order independent from the order in which the frames were received by the switch 12.

The decision making engine (i.e., internal rules checker 58 or the external rules checker 42) outputs a forwarding decision to a switch subsystem 56 in the form of a port vector identifying each MAC port that should receive the data packet. The port vector from the rules checker includes the address location storing the data packet in the external memory 36, and the identification of the MAC ports to receive the data packet for transmission (e.g., MAC ports 0–26). The switch subsystem 56 fetches the data packet identified in the port vector from the external memory 36 via the external memory interface 34, and supplies the retrieved data packet to the appropriate transmit FIFO 54 of the identified ports.

Additional interfaces provide management and control information. For example, a management data interface 59 enables the switch 12 to exchange control and status information with the switch transceivers 16 and the 100 M\bps physical devices 20 according to the MII management specification (IEEE 802.3u). For example, the management data interface 59 outputs a management data clock (MDC) providing a timing reference on the bidirectional management data IO (MDIO) signal path.

The PCI interface 26 is a 32-bit PCI revision 2.1 compliant slave interface for access by the PCI host processor 28 to internal IMS status and configuration registers 60, and access external memory 36. The PCI interface 26 can also serve as an expansion bus for multiple switch devices. The management port 30 interfaces to an external MAC engine through a standard seven-wire inverted serial GPSI interface, enabling a host controller access to the switch 12 via a standard MAC layer protocol.

Figure 3:
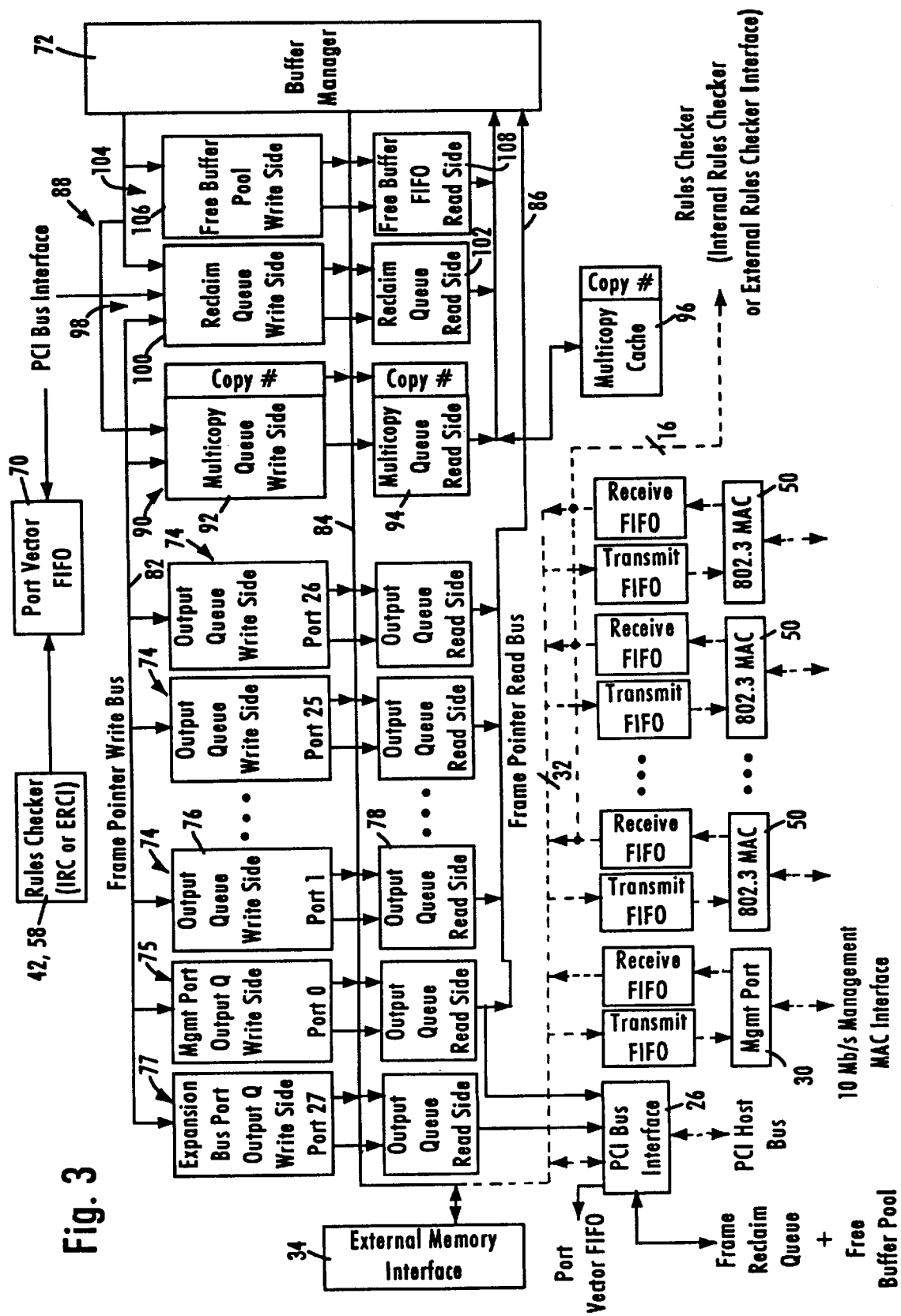
FIG. 3 is a schematic depiction of a switch subsystem of the multi port switch of FIG. 3, constructed in accordance with an embodiment of the present invention.

FIG. 3 depicts the switch subsystem 56 of FIG. 2 in more detail according to an exemplary embodiment of the present invention. Other elements of the multi port switch 12 of FIG. 2 are reproduced in FIG. 3 to illustrate the connections of the switch subsystem 56 to these other elements. The switch subsystem 56 contains the core switching engine for receiving, scheduling and forwarding frames.

The main functional blocks used to implement the switching engine include: a port vector FIFO 70, a buffer manager 72, a plurality of port output queues 74, a management port output queue 75, an expansion bus port output queue 77, a free buffer pool 104, a multicopy queue 90, a multicopy cache 96 and a reclaim queue 98. A brief overview of the switch subsystem 56 of FIG. 3 is presented to provide context to the later discussion of the external memory interface.

There are two basic types of frames that enter the multi port switch 12 from the ports: unicopy frames and multicopy frames. A unicopy frame is a frame that is received at a port which is to be transmitted by the multi port switch 12 to only one other port. By contrast, a multicopy frame is a frame that is received at one port for transmission to more than one port. In FIG. 3, each port is represented by a separate MAC 50, having its own receive FIFO 52 and transmit FIFO 54.

Frames, whether unicopy or multicopy, are received by the internal MAC engines 50. When the frame packet is received at the port, it is placed in the receive FIFO 52. From receive FIFO 52 the frame packet is provided to external memory interface 34. External memory interface 34 strips the header included in each frame and stores the frame data in the external memory, for example SDRAM 36, and provides the header information to a rules checker, either the internal rules checker 58 or the external rules checker 42. The rules checker 42 or 58, based on the information in the header, determines through which port or ports the frame packet be transmitted.

At the same time as the rules checker 42 or 58 is making its forwarding determination, the external memory interface 34 obtains a free buffer pointer from the free buffer pool 104. This free buffer pointer is the initial location in external memory 36 at which the frame will be stored by external memory interface 34. Once the free buffer pointer is obtained from the free buffer pool 104, the buffer pointed to by the free buffer pointer is no longer considered free and the free buffer pointer becomes a frame pointer.

The frame data is stored in external memory 36, for example, as a linked list of data beginning at the location identified by the frame pointer and at other locations identified by subsequent buffer pointers (see, FIG. 8 below). External memory interface 34 also provides the frame pointer to buffer manager 72 and the rules checker 42 or 58.

The rules checker 42 or 58 uses the header information to make the forwarding decision and generate a forwarding instruction in the form of a "port vector". In the exemplary illustrated embodiment, the port vector is a 28-bit vector with a bit set for each output port to which the frame should be forwarded. Assume for this overview example that the received frame is a unicopy frame. Accordingly, only one bit is set in the port vector generated by the rules checker 42 or 58. The bit that is set in the port vector corresponds to a particular one of the ports.

The rules checker 42 or 58 places the port vector and the frame pointer (as well as a control opcode and a VLAN index) into the port vector FIFO 70. The port vector is examined by the port vector FIFO 70 to determines into which particular output queue 74 (or queues) the frame pointer associated with the port vector should be input. The port vector FIFO 70 places the frame pointer into the top of the appropriate output queue 74. This queues the transmission of the frame.

At some point in time, the frame pointer reaches the bottom of the output queue 74 after passing through the output queue 74. The external memory interface 34 reads, or otherwise receives, the frame pointer when it arrives at the bottom of the output queue 74. This schedules the transmission of the frame. The frame data is then read by the external memory interface 34 from the location in external memory 36 pointed to by the frame pointer, placed in the appropriate transmit FIFO 54 and transmitted.

A multicopy transmission is similar to the unicopy transmission, except that the port vector has multiple bits set, designating the multiple ports from which the frame will be transmitted. The frame data is retrieved from external memory 36 by the external memory interface 34, and placed into each of the appropriate transmit FIFOs 54.

The buffer manager 72 uses the special control queues, i.e., the free buffer pool 104, the multicopy queue 90, and the reclaim queue 98, and the multicopy cache 96 to manage the process of allocating buffers to store received frames and retrieving buffers for re-use once the frame has been transmitted to its designated output port(s). The buffer manager 72 can also maintain an "overflow" region in external memory 36 for the output queues 74 and the control queues 104, 90 and 98. With this operational overview serving as background, the external memory interface 34 which prevents under-flow conditions will now be discussed in more detail.

Figure 4:
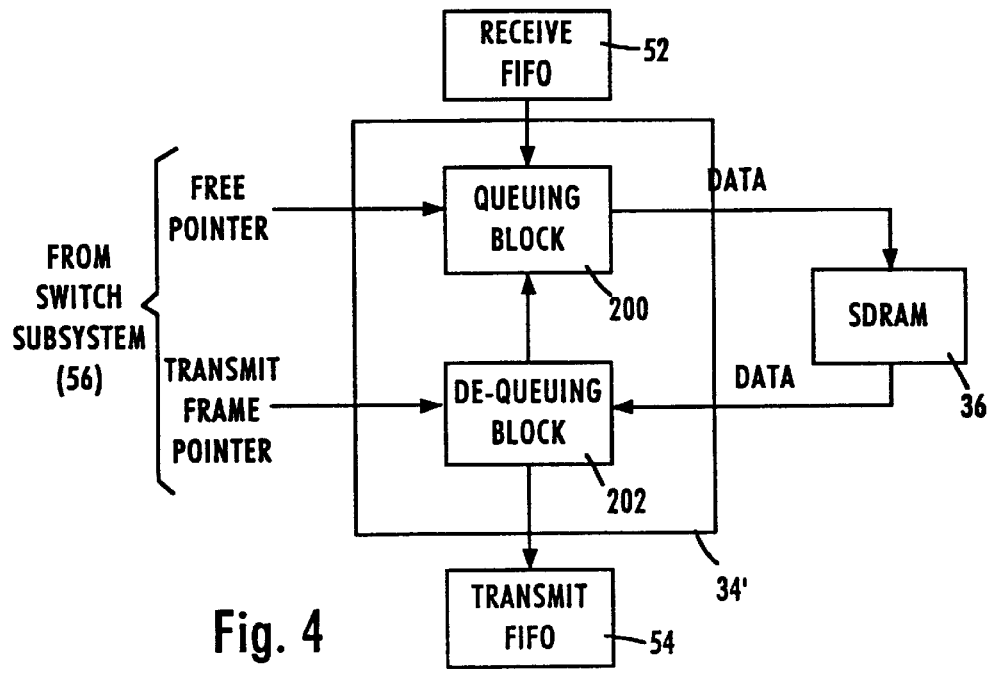
FIG. 4 is a block diagram of an external memory interface, constructed in accordance with an embodiment of the present invention.

FIG. 4 is a block diagram illustrating an external memory interface 34', in accordance with one embodiment of the present invention. As shown, external memory interface 34' is coupled to receive input from FIFO 52, transmit FIFO 54, switch subsystem 56, and SDRAM 36. Within external memory interface 34' there is a queuing block 200, and a de-queuing block 202.

Queuing block 200 receives data and header information from receive FIFO 52. Upon receipt of the data and header information from receive FIFO 52, queuing block 200 requests, or otherwise causes, a free buffer to be assigned for the new frame from free buffer pool 204. The free pointer becomes the frame pointer for the data and header information associated with the new frame. The frame pointer identifies the base address for the first buffer of the frame as it will be stored in SDRAM 36.

Queuing block 200 also provides the header information associated with the frame to other circuits, such as, for example, rules checker 42, 58, port vector FIFO 70 and buffer manager 72. Queuing block 200 also begins storing the data in SDRAM 36 by providing SDRAM 36 with the proper addressing and data signals.

In an exemplary embodiment, SDRAM 36 is divided into a plurality of buffers. When a large packet (i.e., larger than one of the buffers in the memory) is received at receive FIFO 52, queuing block 200 fills several buffers within SDRAM 36. For example, queuing block 200 can create a linked-list of buffers. Thus, when a buffer within SDRAM 36 is full, queuing block 200 will construct the header and write it back to the beginning of the buffer. Then, queuing block 200 will request and receive another free pointer from free buffer 104 and use the free pointer as the address for the next buffer to continue the writing of the data as received from receive FIFO 52. Next, queuing block 200 will go back to the first buffer of the frame to write the remaining portion of the header of the first buffer to update the linked-list.

While queuing block 200 is moving the data from receive FIFO 52 into SDRAM 36, the switch subsystem 56 (as shown in FIGS. 2 and 3) uses the frame pointer and other header information to schedule the frame for transmission through one or more of the transmit FIFOs 54. When the time has arrived for the data to be transmitted via a transmit FIFO 54, de-queuing block 204 receives a frame pointer from one of the output queue read sides 78. De-queuing block 202 uses the frame pointer to locate the first buffer of the frame in SDRAM 36. Once the first buffer of the frame has been located, de-queuing block 202 reads the first buffer header of the frame and captures the information in the header (e.g., buffer length and buffer pointer to next buffer).

De-queuing block 202 then begins to read the data from SDRAM 36 in a DMA transfer and to write the data to transmit FIFO 54. De-queuing block 202 continues to move data from SDRAM 36 to transmit FIFO 54 until such time as the end of the frame is reached, and/or a potential under-flow condition is detected by de-queuing block 202.

For example, if de-queuing block 202 detects a potential under-flow condition then de-queuing block 202 pauses, or otherwise introduces additional latency, until such time as the potential for an under-flow condition no longer exists. The detection of an under-flow condition is discussed in greater detail below.

The integrated multi-port switch as depicted in FIGS. 1–4, in accordance with one embodiment of the present invention, does not rely on each of the subsystems, and/or circuits, to receive an identifier of the receive port number. Hence, because the receive port number is not provided as part of the header and/or data information to these various subsystems and/or circuits, a mechanism is provided to identify the receive port number for each of the received frames of data. Thus, in order to determine if an under-flow condition exists, or potentially exists, the status of the receive port must be determined.

In accordance with one embodiment of the present invention, a mechanism is provided in the queuing block 200 to which a frame pointer is provided and in return the receive port number is identified (provided that the receive port is currently receiving the frame). Thus, a subsystem and/or circuit provides the frame pointer to queuing block 200 and in return queuing block 200 outputs the receive port number. In doing so, a subsystem and/or circuit identifies the status (e.g., currently receiving, or reception completed) of the receive port associated with the frame pointer.

Figure 5:
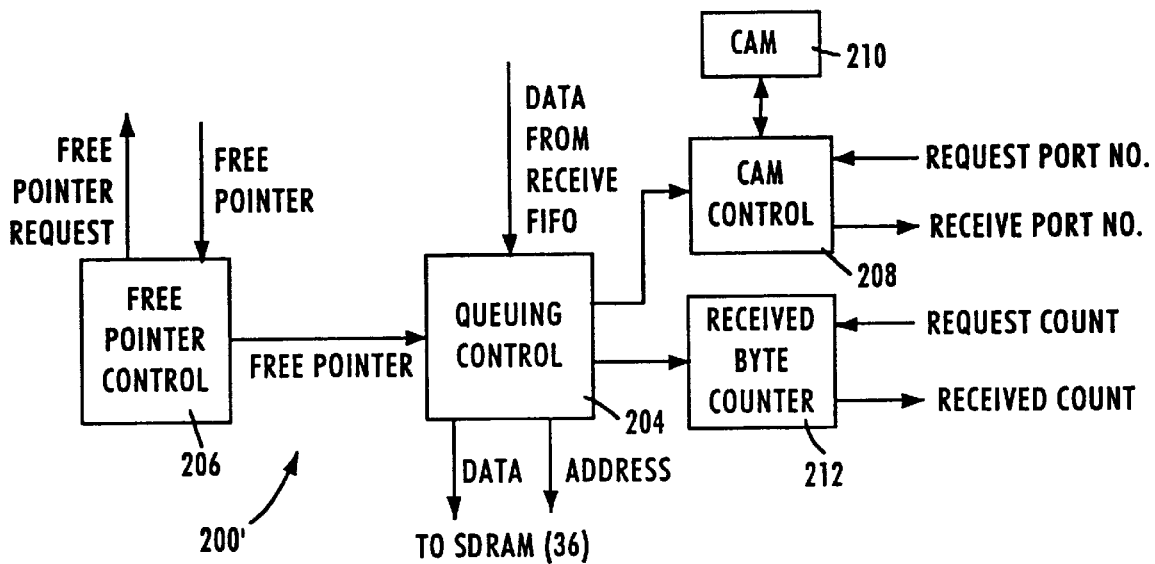
FIG. 5 is a detail of a queuing circuit as in FIG. 4, in accordance with an embodiment of the present invention.

FIG. 5 is a block diagram illustrating a queuing block 200' in accordance with one embodiment of the present invention. Queuing block 200' includes a queuing control circuit 204, free pointer control circuit 206, content addressable memory (CAM) control circuit 208, a CAM 210, and a received byte counter 212. As shown, queuing control circuit 204 receives data from receive FIFO 52. Upon receipt of the data from receive FIFO 52, queuing control 204 (via free pointer control 206) requests a free pointer and upon receipt assigns the free pointer as the frame pointer for the data received. Next, queuing control 204 begins writing the data, as received from receive FIFO 52, to SDRAM 36 in a DMA transfer.

While writing the data to SDRAM 36, queuing control 204 also provides header and frame pointer information to other subsystems and/or circuits. Queuing control 204 further provides information relating to the amount of data received from receive FIFO 52, to received byte counter 212. Received byte counter 212 measures or otherwise keeps track of the amount of data received. For example, received byte counter 212 can count the number of bytes of data received at receive FIFO 52.

Additionally, while queuing control 204 is receiving and storing the data in the SDRAM 36, the frame pointer is provided to CAM control 208. The frame pointer is stored in a particular register within CAM 210 by CAM control 208. For example, in one embodiment, the particular register within CAM 210 is one entry in a lookup table, the entry being associated with a particular receive port.

As such, CAM control 208 provides a mechanism for other subsystems and/or circuits to determine the status and the receive port number for a particular frame that is being processed by queuing control 204. As shown in FIG. 5, CAM control 208 receives a request port number signal from other subsystems and/or circuits, for example, de-queuing block 202 and/or rules checker 42, 58. In one embodiment, the request port number signal is the frame pointer associated with a particular data. Thus, upon receiving the frame pointer, CAM control 208 will then access the lookup table in CAM 210 to determine if the frame pointer is within one of the entries (registers) of the lookup table in CAM 210.

Figure 6:
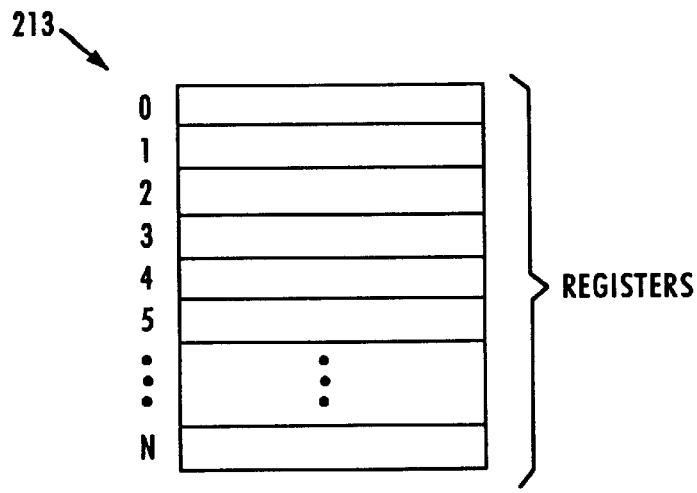
FIG. 6 is a block diagram illustrating a lookup table, in accordance with one embodiment of the present invention.

With this in mind, FIG. 6 illustrates a lookup table 213 for use, for example, in CAM 210 in accordance with one embodiment of the present invention. Lookup table 213 includes a plurality of registers, one register for each receive port. Thus, for example, an integrated multi-port switch having 24 receive ports would require a lookup table 213 having 24 registers and/or entries therein. Each entry may store a frame pointer.

Queuing block 200', in FIG. 5, is also accessible by other subsystems and/or circuits, such as de-queuing block 202, to further inquire as to the status of the data as received from the receive FIFO 52. As shown, received byte counter 212 receives a request count for a particular receive port number, and in return outputs the received count.

Thus, referring back to FIG. 4, de-queuing block 202 upon receiving a frame pointer signals to queuing block 200 to request a receive port number. In requesting a port number, de-queuing block 202 provides the frame pointer to CAM control 208. CAM control 208 uses the frame pointer, as received from de-queuing block 202, to search the contents of the lookup table in CAM 210. If there is a match (e.g., the frame pointer is located within the lookup table), then CAM control 208 outputs the associated receive port number based on the register within which the frame pointer was stored.

Once de-queuing block 202 is made aware of the receive port number, then de-queuing block 202 again accesses queuing block 200 to request the current count of the data received by queuing block 200. This is done, for example, by providing the receive port number as a request to received byte counter 212. Upon receiving the receive port number from de-queuing block 202, received byte counter 212 outputs the received count. Thus, de-queuing block 202 exchanges information with queuing block 200 to determine if the data is still being received by queuing block 200 and if so, how much data has been received thus far. Furthermore, de-queuing block 202 continues to check the status of the receive port number and the received count in this manner during the forwarding process.

Figure 7:
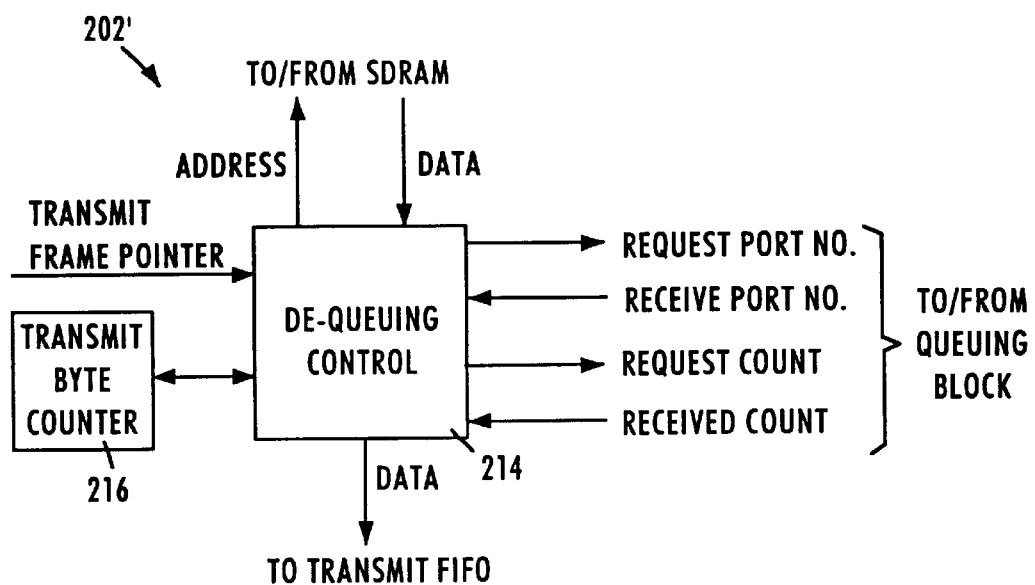
FIG. 7 is a block diagram of a de-queuing circuit as in FIG. 4, constructed in accordance with an embodiment of the present invention.

FIG. 7 is a block diagram illustrating a de-queuing block 202', in accordance with one embodiment of the present invention. De-queuing block 202' includes a de-queuing control circuit 214 and a transmitted byte counter 216. As shown, de-queuing control 214 receives a transmitted frame pointer from the output queue, and uses the transmitted frame pointer to request a port number from queuing block 200. If de-queuing control circuit 214 receives a port number back from queuing block 200, then the frame is still being received by queuing block 200 from receive FIFO 52. If no receive port number is returned (i.e., there is no match in the lookup table) then the queuing block 200 has completed processing the entire frame into SDRAM 36.

If queuing block 200 has completed processing the frame from receive FIFO 52 into SDRAM 36, then de-queuing control circuit 214 immediately begins reading, and/or otherwise retrieving, the data from SDRAM 36 and supplying this data to transmit FIFO 54. In this situation, since the entire frame has been received there is no chance of an under-flow condition existing.

If queuing block 200 has not completed processing the entire frame into SDRAM 36, then de-queuing control circuit 214 receives a receive port number from queuing block 200. Once de-queuing control circuit 214 is aware that queuing block 200 is still processing and receiving data, then de-queuing control circuit 214 requests the count of the data received thus far by queuing block 200. The received count from queuing block 200 is then used within de-queuing control circuit 214 to determine whether to transmit the data to transmit FIFO 54 at that time, or to wait and transmit at a later time.

De-queuing control circuit 214 compares the received count to a transmit count (as determined by transmitted byte counter 216). Transmitted byte counter 216 is arranged to count the number of bytes, for example, of data provided to transmit FIFO 54 for a particular frame. As such, de-queuing control circuit 214 compares the receive count to the transmit count to determine if the transmit count is within a safe operating range of the received count.

For example, in one embodiment, de-queuing control circuit 214 is arranged to wait (or pause) during a transmission if the difference between the transmit count and the received count falls below a specified threshold safe value level. By way of example, assume that the received count is 100 bytes and the transmit count is 50 bytes, and the threshold safe value level is set to 12 bytes. In this case, de-queuing control circuit 214 can transmit data because 50+12<100. Assuming that, for some reason queuing block 200 is unable to process frame data for a short duration and the received count remains at 100 while at the same time de-queuing control circuit 214 continues to transmit data, at some point the transmit count will approach the received count and the difference will be less than the threshold safe value level (12 bytes) and de-queuing control circuit 214 will be forced to wait until such time as additional data is received, and the received count again exceeds the transmit count by the threshold safe value level. Thus, if the transmit count is 88 bytes and the received count is 100 bytes, then de-queuing control circuit 214 will pause for a brief period until queuing block 200 has again again received and processed additional data.

By providing a threshold safe value level to de-queuing control circuit 214, potential under-flow conditions can be predicted and avoided. Thus, a hand-shaking type control is provided between queuing block 200 and de-queuing block 202 that prevents attempted reading out of SDRAM 36 prior to the actual data being stored in SDRAM 36. Furthermore, by having the threshold safe value level being programmable, multiple modes of operation are supported by the external memory interface 34.

Referring now to FIG. 8, frame data received from any transmit port (including the PCI bus) is stored in external memory 36 (by the external memory interface 34), in a linked-list data structure format, in accordance with an exemplary embodiment of the present invention. The buffers 140 used to create the linked-list are 256 bytes in length, although other sized buffer lengths are employed in different embodiments of the invention. To link these buffers together, the external memory interface 34 requests free pointers from the free buffer pool 104 and, as illustrated, uses these free pointers as either the initial frame pointer 141 or as subsequent buffer pointers in the buffer headers 142. Thus, the buffers 140 are chained together by buffer pointers in each of the buffer headers 142 that indicate the location of the next buffer in memory.

The buffer headers 142 also contain other information about the frame data contained in the buffer 140. The first buffer's header is 12 bytes, as depicted in the exemplary buffer header format of FIG. 9a. Each subsequent buffer's header is 4 bytes, as depicted in FIG. 9b.

As depicted in FIGS. 9a and 9b, the first and subsequent buffer header formats contain the following fields:

Buffer Format Bit: indicates what buffer format is in use. A one indicates the first buffer's format, which is 12 bytes in length. A zero indicates a subsequent buffer's format, which is 4 bytes. It is used for each of the remaining buffers when chaining buffers.

E Bit (End of Frame Marker): indicates this is the last buffer for a frame. When the E bit is set, there are no more buffers in the chain.

C Bit (CRC Error Detected): indicates a CRC error was detected by the receiver. When the C Bit is detected, the transmit function will purposely transmit an inverted CRC.

L Bit (Alignment Error): indicates a Frame Alignment Error was detected (along with a CRC Error) in the receive frame.

O Bit (Receive FIFO Overflow): indicates the receive FIFO overflowed and the data in the buffer may not be valid.

Buffer Length: the total number of bytes which are valid in the data field of the buffer beginning with the first byte after the buffer header. This length should not include the Offset Byte value.

Next Buffer Pointer: the pointer to the next buffer. The next buffer pointer is not valid when the E Bit is set.

Offset Byte Count: indicates where the first byte of the frame starts in the frame data section of the buffer. An offset of zero means the data will begin at the first byte after the buffer header 142. An offset of zero indicates frame data will begin at the byte following the $16^{th}$ byte in the buffer. For non-zero values of offset, frame data will begin following 16B+Offset from the beginning of the buffer. The transmit function will skip over the number of bytes indicated in the offset Byte field.

P Bit (Port Type): indicates the port type of the incoming receive frame. A zero indicates a 10 Mb/s port and a one indicates a 100 Mb/s port. This bit is used by the host 28 in conjunction with the time stamp field when it programs the switch 12 to forward frames to the expansion bus before the frame is completely received and buffered to external memory 36.

T Bit: indicates the received frame type: tagged or untagged. A one indicates a tagged frame and the VLAN Identifier field contains the received VLAN ID. A zero indicates an untagged frame and the VLAN ID is not valid.

Receive Port Number: the number of the port from which the frame was received.

VLAN Identifier: the VLAN ID received from a "tagged" port. If the frame was received from an untagged port, this field is invalid.

R Bit (Recalculate CRC): indicates the CRC needs to be stripped and recalculated at the transmit function. The switch 12 sets this bit when a tagged frame is received. In addition, if the host 28 modifies a frame's contents, the host 28 should set this bit. When the switch 12 transmits a frame, it will examine this bit to determine whether to transmit the existing CRC or strip and recalculate the CRC.

A Bit (Append CRC): indicates that there is no CRC at the end of the frame data. The host can create a frame in memory (without a CRC) then set this bit. The switch 12 will generate and append a CRC when transmitting the frame. If the A Bit is set, the frame length should not include CRC.

F Bit (Format Bit): identifies the Frame Length/Time Stamp field. A zero indicates the field is the time stamp of the incoming frame. A one indicates the field is the frame length of the received frame.

Frame length/time stamp: dependent on F Bit. IF F Bit is cleared, this field represents the time stamp from the beginning of the received frame. The time stamp has a resolution of 1 μs. If the F Bit is set, indicates the total length of the received frame including CRC and any received VLAN Tag. When a frame is received, the switch 12 marks this field with the time stamp (from the timer register). If the host 28 has programmed the switch 12 to forward expansion bus frames before the frame has been completely received, it can use the time stamp (along with the speed of the receive port) to gauge how much data it can fetch from external memory 36 without over-reading the frame data. Once the entire frame has been received, the switch 12 writes the frame length into this field and sets the F Bit.

Copy number: used to indicate the number of copies successfully queued for transmission by the port vector FIFO 70. This field is used to store the copy number for a frame pointer if the buffer manager 72 needs to make space in the multicopy cache 96 for new entries.

With this in mind, the three operating modes will now be described in more detail. One of these operating modes is applied to each of the receive ports for each frame of data received. The designated operating mode determines the minimum forwarding latency of the forwarding device (i.e., how soon the switch 12 will forward a frame once it begins receiving the frame).

In all three modes, frame data received at the receive FIFO 52 is forwarded to the external memory interface 34 and then to the external memory 52. The external memory interface 34 is capable of providing other subsystems and/or circuits with the header information such as the destination and source addresses, and other information such as the frame port number and the receive port number (e.g., in a manner as described above).

While this is occurring, the port vector FIFO 70 places the transmit frame pointer in the write side 76 of the output queues 74 for the output port(s) identified in the port vector. The receive port's mode defines the latency between when the port vector FIFO 70 receives the port vector (and the transmit frame pointer) and places the transmit frame pointer into the output queue(s) 74. This is described for the three modes below.

Once the transmit frame pointer passes to the read side 78 of the output queues 74, the external memory interface 34 reads the transmit frame pointer and proceeds to transmit the data stored in the memory in accordance with the designated mode.

The first mode is designed to provide the lowest latency. Frames are received and forwarded at line-rate speed. In the first mode there is no network error protection because a frame is queued for transmission before it can be determined whether the frame is a fragment (i.e., <64 bytes in length) or contains a CRC error. Thus, frame reception need not complete before frame transmission at the transmit port(s) commences.

The second mode mode, provides low latency for forwarding frames, while also allowing for limited network error protection. In the second mode, frames are received and forwarded after a threshold size block of data, e.g., sixty-four or more bytes, have been received. This allows the switch 12 to filter (i.e., not forward) fragments of frame; however, it does not completely filter CRC error frames that are greater than the threshold size.

In the second mode, frame pointers for frames which achieve the threshold size at the receive port are queued to the appropriate output queue(s) 74. Frames which fail to achieve the threshold size are deleted and their frame pointers are not placed in output queue(s) 74. If a receive frame greater than or equal to the threshold size terminates with an invalid CRC, the external memory interface 34 marks the buffer header 142 in external memory 36 to indicate this condition. If transmission has commenced on a frame greater than or equal to the threshold size which later terminates with an invalid CRC, the external memory interface 34 completes the transmission, however with a bad CRC. If the external memory interface 34 has not started a frame transmission and the buffer header 142 indicates the frame (greater than or equal to sixty-four bytes) terminated in an invalid CRC, then the external memory interface 34 and/or buffer manager 72 causes the frame pointer to be returned to the reclaim queue 98 (for a unicopy forward) or the multicopy queue 96 (for a multicopy forward) without being scheduled via the output port(s) 74.

The third mode provides the highest level of network error protection among the three modes, but has a higher forwarding latency. In the third mode, frames are completely received before the external memory interface 34 forwards them to the transmit FIFOs 54. Thus, the external memory interface 34 and switch 12 essentially screens out all fragments and CRC error frames before forwarding. Once a valid frame completes successfully at external memory interface 34, then the frame pointer is queued to the appropriate output queue(s) 74, and the frame is eventually provided to the transmit FIFOs 54 via external memory interface 34. Frames which terminate in a receive error (e.g., invalid CRC, runt, etc.) are deleted and their frame pointers are not placed in output queue(s) 74.

Thus, a switch having an external memory interface as described herein by example, provides the necessary mechanism to support all three of the operating modes. For those modes in which the data frame has yet to be completely received (and is essentially a data stream while received), external memory interface 34 actively monitors the received data and the transmitted data to ensure that the incoming data stream (i.e., received) does not under-flow the outgoing data stream (i.e., transmitted). Additional control is gained by defining a threshold safe value level that defines how close the incoming and outgoing data streams can get. If the threshold safe value level is breached then the outgoing data stream is temporarily delayed (adding an additional latency) so as to allow the incoming data stream to get ahead of the outgoing data stream thereby avoiding a potential under-flow condition.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A method for preventing under-flow of data forwarded in a device having multiple receive and transmit ports, an under-flow of data occurring when the device attempts to forward more of the data than has been received by the device, the method comprising:

independently designating each of the receive ports with a mode that indicates the amount of data that must be received by that receive port prior to initiation of the forwarding of the data from the device;

identifying the receive port that is receiving a set of data as the set of data is being received at the receive port;

determining the designated mode of the receive port that is receiving the set of data; and forwarding the set of data to at least one transmit port in accordance with the designated mode of the receive port provided that a difference between an amount of the set of data that has been received at that receive port and an amount of the set of data that has been forwarded to a transmit port is at least as great as a threshold amount for the designated mode, wherein the threshold amount is such as to prevent under-flow in the device.

2. The method of claim 1, wherein the step of designating includes selecting the mode from among at least two modes, the modes indicating an amount of the set of data that must be received at the receive port prior to initiation of the forwarding of the data from the device.

3. The method of claim 2, wherein at least one of the two modes is selected from the group of a first mode, a second mode, and a third mode, wherein in the first mode data is received and forwarded without significant delay, in the second mode data is received and forwarded only after a threshold amount of data has been received, and in the third mode a complete frame of data is received prior to being forwarded.

4. The method of claim 2, wherein the step of determining the receive port that is receiving a set of data includes accessing a table configured to associate a receive port and a data identifier that identifies a set of data being received at that receive port, by using the data identifier to determine the associated receive port.

5. In a data forwarding device having a plurality of receive ports and a plurality of transmit ports, an interface for use between the plurality of receive ports and the plurality transmit ports to ensure, for each of the plurality of receive ports, that data being forwarded from the receive port to at least one of the transmit ports has actually been received, the interface comprising:

a queuing circuit coupled to at least one of the plurality of receive ports and configured to receive data therefrom, identify the receive port from which the data is being received, count an amount of data received, and buffer the data received; and a de-queuing circuit coupled to the queuing circuit and configured to retrieve the buffered data from the queuing circuit at a specific time, and forward the retrieved data to at least one of the plurality of transmit ports provided that the amount of data received by the queuing circuit for an identified receive port is at least as great as the sum of an amount of data forwarded by the de-queuing circuit and a threshold safe level amount of data.

6. The interface as recited in claim 5 wherein the queuing circuit includes:

a memory configured to buffer at least a portion of the data received by the queuing circuit from at least one of the plurality of receive ports; and a controller coupled to the memory and at least one of the plurality of receive ports and configured to receive data from the receive ports, access the memory and store the data in the memory.

7. The interface as recited in claim 6 wherein the controller includes:

a queuing control circuit coupled to the receive port and the memory; and a pointer controller coupled to the queuing circuit and configured to provide an pointer to the queuing circuit for use with the received data, the pointer identifying a location within the memory in which the queuing control circuit is to begin storing the received data.

8. The interface as recited in claim 7 wherein the controller further includes:

a local memory arranged to store a plurality of pointers, wherein each of the plurality of pointers is associated with one of the plurality of receive ports and a storage location of each of the plurality of pointers in the local memory identifies the receive port; and a second memory control circuit coupled to the queuing control circuit and the local memory and configured to access the local memory to store the pointer associated with data received at the receive port in the corresponding storage location, and search the second memory for a specified pointer and identify a receive port associated with the specified pointer.

9. The interface as recited in claim 8 wherein the controller further includes a received data counter coupled to the queuing control circuit and configured to output the amount of data received by the queuing control circuit for the receive port.

10. The interface as recited in claim 6 further comprising a scheduling circuit coupled to the interface and configured to identify a time the received data is to be forwarded by the de-queuing circuit to one or more of the transmit ports.

11. The interface as recited in claim 10 wherein the de-queuing circuit includes a de-queuing control circuit coupled to the scheduling circuit, the memory, the controller, and the plurality of transmit ports, the de-queuing control circuit being configured to access the memory upon receipt of a frame buffer pointer from the scheduling circuit, and to forward the received data in the memory to at least one of the plurality of transmit ports.

12. The interface as recited in claim 5 wherein the threshold safe level amount of data is independently designated for each of a plurality of operating modes.

13. The interface as recited in claim 12 wherein at least two of the plurality of operating modes is selected from group of a first mode, a second mode, and a third mode, wherein in the first mode data is received and forwarded without significant delay, in the second mode data is received and forwarded only after a threshold amount of data has been received, and in the third mode a complete frame of data is received prior to being forwarded.

14. A data forwarding device for use in transferring data between two or more external apparatus, the data forwarding device comprising:

a plurality of receive ports, wherein each of the external apparatus is coupled to at least one of the plurality of receive ports;

a plurality of transmit ports, wherein each of the external apparatus is coupled to at least one of the plurality of transmit ports; and an interface comprising;

a queuing circuit coupled to at least one of the plurality of receive ports and configured to receive data therefrom, identify the receive port from which the data is being received, count an amount of data received, and buffer the data received; and a de-queuing circuit coupled to the queuing circuit and configured to retrieve the buffered data from the queuing circuit at a specific time, and forward the retrieved data to at least one of the plurality of transmit ports provided that the amount of data received by the queuing circuit for an identified receive port is at least as great as the sum of an amount of data forwarded by the de-queuing circuit and a threshold safe level amount of data.

15. A control circuit for preventing under-flow conditions in a data forwarding device, the control circuit comprising:

a supply circuit arranged to provide an incoming stream of data; and an interface circuit coupled to the supply circuit and arranged to monitor the incoming stream of data, produce a corresponding outgoing stream of data that lags behind the incoming stream of data by a first latency, and delay the outgoing stream of data by an additional latency if the incoming stream of data is provided by the supply circuit at a receive rate that is slower than a transmit rate for the outgoing stream of data;

and wherein the interface circuit includes: a memory arranged to store at least a portion of the incoming stream of data; a queuing circuit coupled to a plurality of receive ports and the memory arranged to temporarily store at least a portion of the incoming stream of data in the memory; and a de-queuing circuit coupled to the memory, the de-queuing circuit and a scheduling circuit arranged to retrieve the portion of the temporarily stored incoming stream of data from the memory and to produce the corresponding outgoing stream of data, and further arranged to monitor a received amount of the incoming stream of data and a transmitted amount of the outgoing stream of data whenever the transmitted amount is within a threshold safe level amount of the received amount.

16. The control circuit as recited in claim 15 wherein the safe level amount is based on an operating mode of the receive port, the operating mode being selected from at least two selected from a first mode, a second mode, and a third mode, wherein in the first mode data is received and forwarded without significant delay, in the second mode data is received and forwarded only after a threshold amount of data has been received, and in the third mode a complete frame of data is received prior to being forwarded.

* * * * *